April 6, 1954 T. A. WETZEL 2,674,649

APPARATUS FOR COLOR TELEVISION

Filed Jan. 13, 1950 4 Sheets-Sheet 1

INVENTOR.
Theodore A. Wetzel
BY
Arthur R. Woolfolk
Attorney

April 6, 1954 T. A. WETZEL 2,674,649

APPARATUS FOR COLOR TELEVISION

Filed Jan. 13, 1950 4 Sheets-Sheet 2

INVENTOR.
Theodore A. Wetzel
BY
Arthur R. Woolfolk
Attorney

April 6, 1954 T. A. WETZEL 2,674,649

APPARATUS FOR COLOR TELEVISION

Filed Jan. 13, 1950 4 Sheets-Sheet 3

INVENTOR.
Theodore A. Wetzel
BY
Arthur R. Woolfolk
Attorney

INVENTOR.
Theodore A. Wetzel
BY
Arthur R. Woolfolk
Attorney

Patented Apr. 6, 1954

2,674,649

UNITED STATES PATENT OFFICE 2,674,649

APPARATUS FOR COLOR TELEVISION

Theodore A. Wetzel, Milwaukee, Wis.

Application January 13, 1950, Serial No. 138,404

4 Claims. (Cl. 178—5.4)

This invention relates to a method and apparatus for color television.

An object of this invention is to provide for the complete color intensity scanning for complete color coverage of the entire picture so that all elements of the subject and picture image, no matter how small, will be completely scanned for relative intensity of each color, and, likewise, so that all elements of the picture reproduced at the receiver will accurately correspond in color to the original subject, or so appear.

In the preferred forms that this invention may take it is a further object to provide an apparatus and process in which the color filters are stationary and yet in which the ordinary single band or channel transmission television system for color picture transmission can be employed as distinguished from simultaneous multiple transmission, utilizing more than one band or channel.

In greater detail, in certain forms of this invention, objects are to provide means for shifting the picture image and/or intensity scanning beam to different portions of the color filter while the color filter remains stationary, and in still other forms to provide for the shifting of the color filter itself, the shift being minute in all cases and yet insuring the complete color commutation or color coverage of the entire picture.

Further objects are to provide an apparatus and system which will not interfere in any manner with the ordinary black and white picture reception and which, in certain forms of the invention will not tend to produce blurring of the received picture, even if black and white picture reception is taking place at certain receivers during color picture transmission with the ordinary type of black and white picture receivers employed; and which transmission is also adapted for the reception of black and white pictures for monachrome reception even on receivers equipped to receive color pictures.

In certain forms of the invention further objects are to provide an apparatus and a method for the making of the color filter at the receiver while the transmitter is sending out color intelligence or information for the express purpose of producing color filters at the several receivers, each correcting exactly for any individual defect or departure of that particular receiver from the normal, so that the color filter made for any selected receiver will exactly match or conform to the needs of that receiver.

Embodiments of the invention are shown in the accompanying drawings, in which.

Figures 6, 7, 8, 11A, 11B:
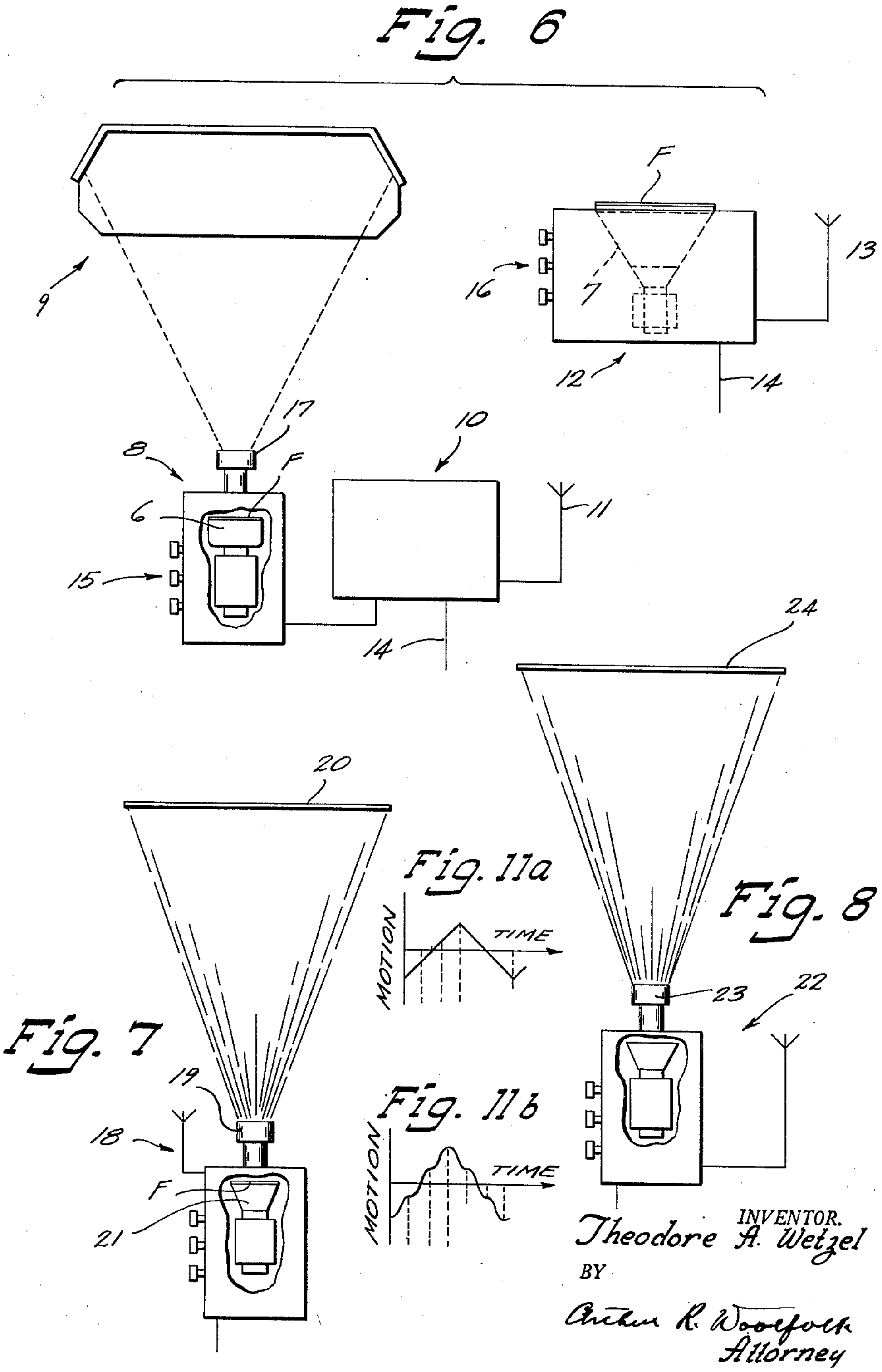
Figure 6 is a view showing a transmitter and receiver.
Figure 7 is a view of a projection type receiver.
Figure 8 is a further view corresponding to Figure 7 of a different type of projection receiver.
Figure 11:
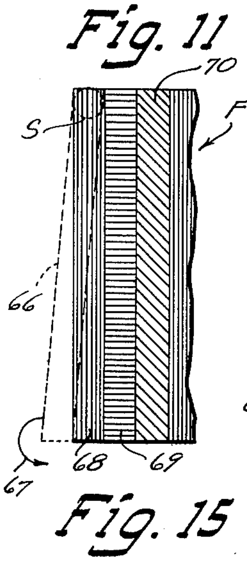
Figures 11 through 14 show successive positions of the intensity scanning beam coincidence spot during a portion of a shifting cycle of the picture image, each figure showing a portion of the filter.
Figure 12:
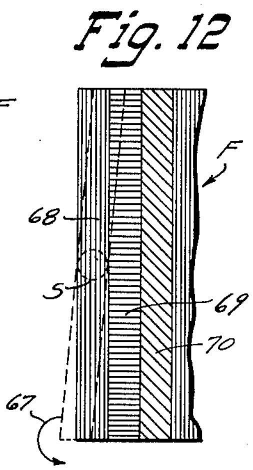
Figure 13:
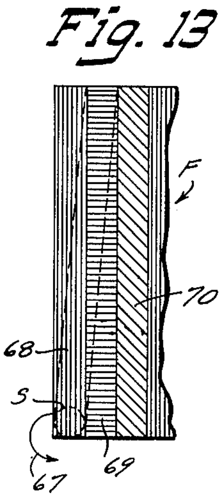
Figure 14:
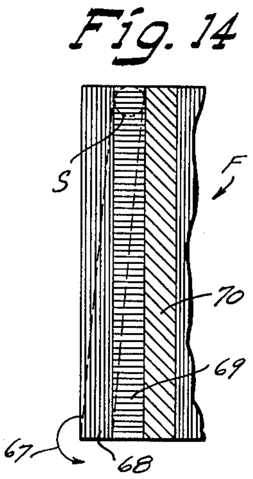
Figure 15:
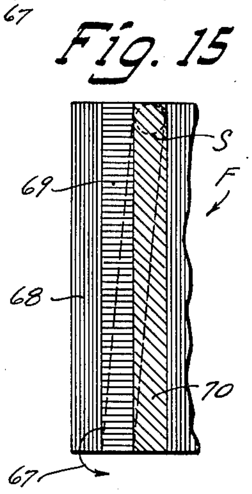
Figure 15 shows a further position of the intensity scanning beam coincidence spot during a part of the same half of the shifting cycle of the picture image, such view showing a portion of the filter.

Figures 11*a* and 11*b* show time displacement curves of the picture image.

Figure 17:
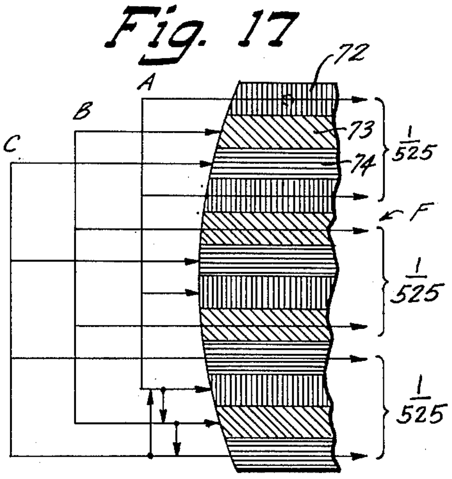

Figure 17 shows a fragment of a further form of filter for triple color and/or interlacing.

Figure 18:
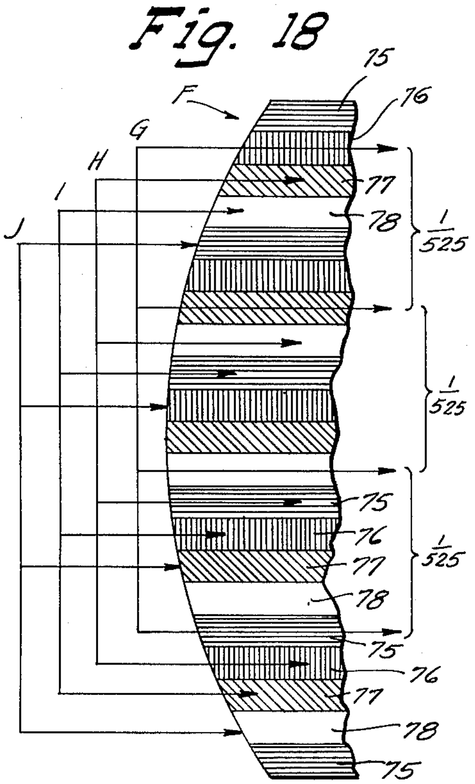

Figure 18 shows a fragment of a further form of filter for quadruple color and/or interlacing in a different manner.

Figure 19:
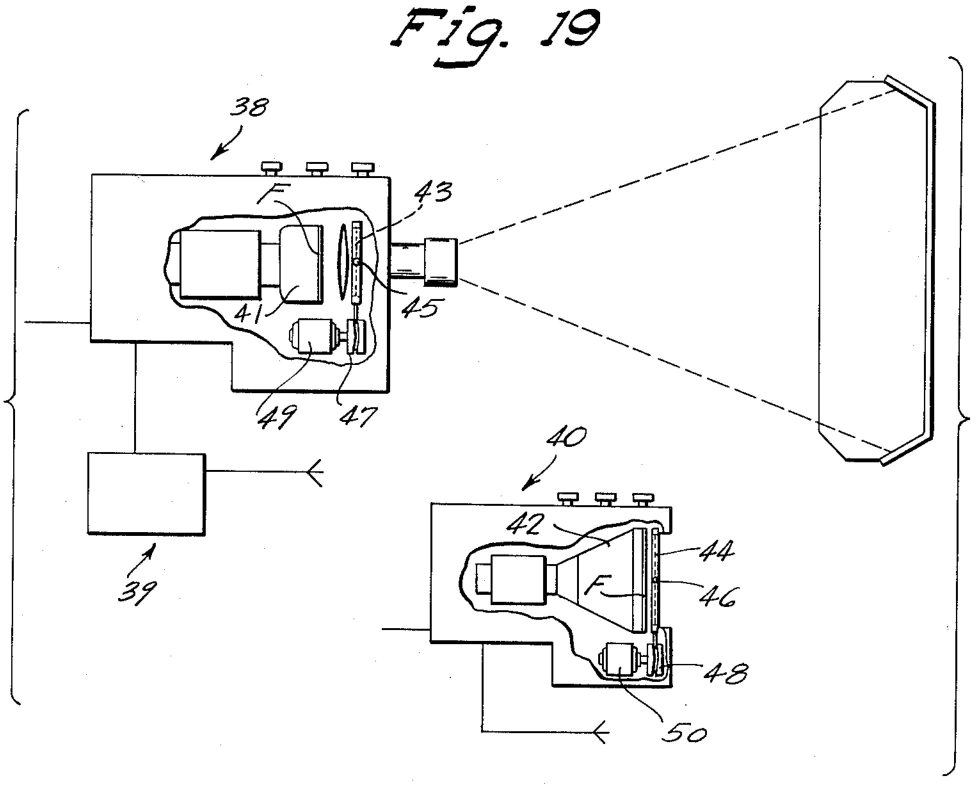

Figure 19 is a view of a further form of the invention such view showing the transmitter and receiver.

Figure 20:
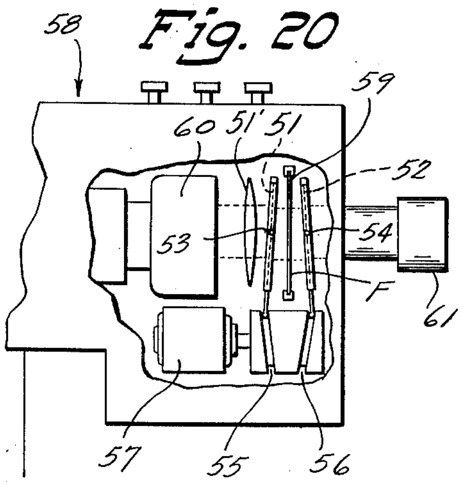
Figure 21:
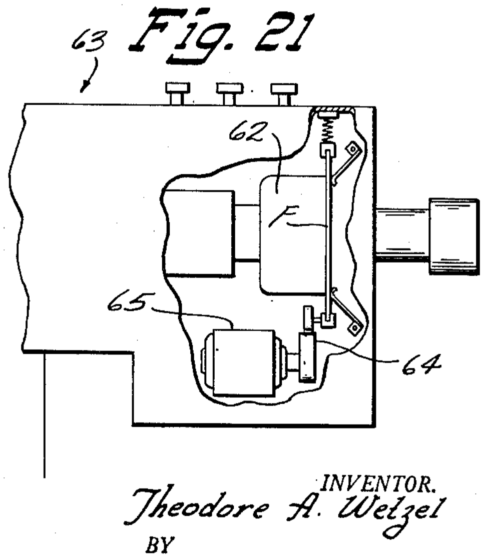

Figures 20 and 21 are fragmentary views of a receiver showing a further form of the invention.

In carrying out the invention, a screen or wall of considerable area, for example having a number of square feet, is accurately painted or formed in other ways with one or more cycles of colored stripes each cycle comprising a series of stripes of colors arranged in a regular order. For example, red, green and blue repeating in this manner.

Figure 1:
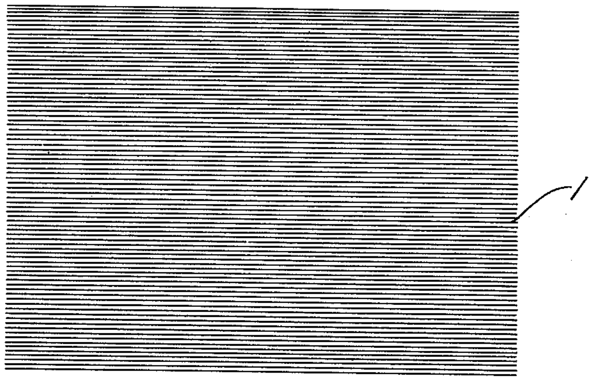
Figure 1 is a view representing an enlarged plate which is painted or otherwise formed in lines with the lines very close together, no attempt having been made to show the individual colors.
Figures 2, 3, 4, 5, 9, 10:
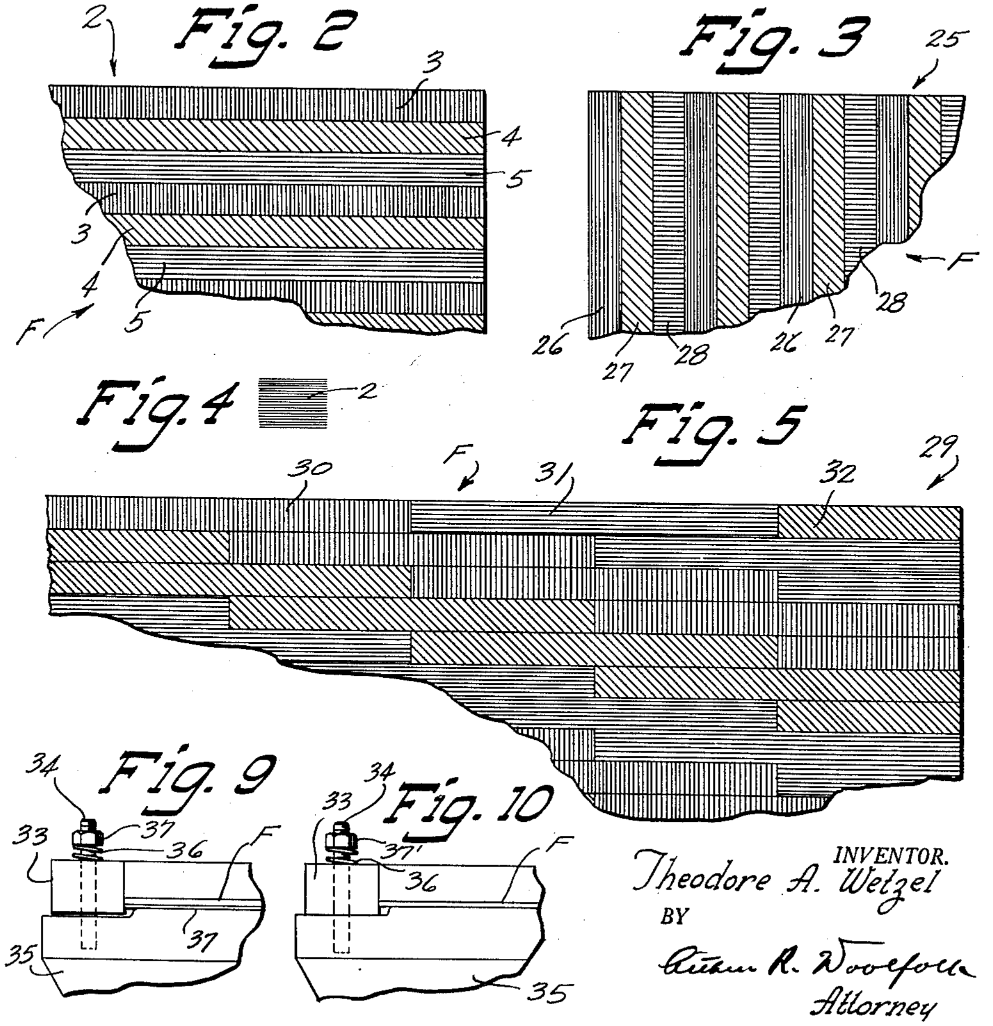
Figure 2 is an enlarged fragmentary view of one form of filter.
Figure 3 is a view corresponding to Figure 2 showing a modified form of the filter.
Figure 4 is a view showing a photographic reduction of Figure 1.
Figure 5 is a view corresponding to Figure 2 showing a still further form of the filter.
Figure 9 is a fragmentary view showing a portion of a kinescope arranged to produce a color filter.
Figure 10 is a view corresponding to Figure 9 showing a fragment of the kinescope as it is used after the color filter has been produced.

After the screen shown in Figure 1 has been formed with the maximum degree of accuracy possible, it is then photographed by any of the usual color photographic methods and the transparent film or plate is developed in a reduced size, as shown in Figure 4 for example. In Figure 1 the painted screen is indicated by the reference character 1 and in Figure 4 the transparent color film or plate, which constitutes the filter as will appear later, is indicated by the reference character 2. This color filter is shown in an enlarged manner for a fragment thereof in Figure 2 and it comprises a regular series of horizontal color stripes, for example color stripes of red, green, and blue indicated at 3, 4, and 5 respectively.

In using this color filter, it is intended that the orthicon tube indicated generally by the reference character 6 in Figure 6 be provided with the transparent color filter F. This color filter may be of the type shown in Figure 2, as thus far described. Similarly, the kinescope tube 7 is provided with a similar color filter F. The stage for the camera portion 8 is indicated by the reference character 9 and may consist of any desired zone or area with moving subjects or with stationary subjects, if desired. The transmitter includes the transmitting portion 10, the antenna 11 and, similarly, the receiver is indicated generally by the reference character 12 and is provided with an antenna 13. Obviously the transmitter and receiver are provided with power input lines 14 which are supplied with electric power in the usual manner. The several adjusting controls are indicated generally at 15 and 16 for the transmitter and receiver.

It is obvious that if it is desired, the transmitter could be connected by suitable means directly with the receiver so as to have wired transmission in the usual way. However, the invention is primarily intended for broadcasting the televised picture to a large number of receivers by radiant energy through the medium of the antenna system.

In the invention as thus far described, it is imperative to have the intensity scanning ray of the receiver register geometrically with the color filter F in identically the same manner as the intensity scanning ray of the transmitter registers with its color filter F.

It is to be noted that in the form of the invention shown in Figure 6 the televising camera is provided with the ordinary lens system 17, whereas for the receiver 12, such lens system may not be needed and a direct view tube may be used. It is understood, however, that the invention is not limited in this manner, but that a receiver indicated generally by the reference character 18, see Figure 7, of the projection type may be equipped with a lens system 19 to provide the image on either an opaque or translucent screen 20. In this case, the color filter F is carried on the front face of the projection kinescope 21. However, the filter may be dispensed with for a receiver indicated generally at 22 in Figure 8, where the receiver is a projection type receiver having a lens system 23 that projects the image on a screen 24 which is provided with a regular series of color stripes of exactly the same arrangement and order as that shown in Figure 2 or, at all events, of exactly the same type of color filter as that employed at the transmitter.

Only one type of color filter has been shown in Figure 2 and described thus far. It is intended that all of the color filters described shall be referred to generally by the reference character F, irrespective of the type of the color filter and such has been indicated in each of the figures where the color filter appears.

The color filters may take many other forms from that shown in Figure 2. For example, in Figure 3 a color filter 25 has been shown which also is indicated generally by the reference character F. This color filter has a series of vertical regularly arranged color stripes, for example, red, green, and blue indicated by the reference characters 26, 27, and 28, respectively and similarly, to the color filters hereinabove described, it is transparent. When this type of color filter is used for the transmitter, exactly the same color filter must be used for the receiver and the sweep of the intensity scanning ray also must include the same number of color elements for each sweep for both the transmitter and receiver, so as to have absolute registering of the two intensity scanning rays with identically the same color at both the transmitter and receiver.

It is to be noted particularly with reference to the horizontally arranged color stripes, as shown for instance in Figure 2, that such figure shows a filter that may be used for noninterlaced intensity scanning sequence. It is obvious that the filter shown in Figure 2 can be used for interlaced intensity scanning sequence, depending on the intensity scanning pattern program established.

Other arrangements of the color stripes for the filter could be employed. One of these is shown in Figure 5 in which the filter is indicated generally by the reference character 29 and is provided with a plurality of horizontal color stripes which are interrupted and have a regular sequence of colors appearing in each horizontal color stripe. For example, as shown in Figure 5 the color sections in each horizontal stripe for red, blue and green, are indicated by the reference characters 30, 31, and 32, respectively. Thus each horizontal stripe is composed of a multitude of small segments or sections of the colors arranged in a regular sequence. It will be noted that this arrangement in effect constitutes a diagonal orientation of filter stripes and as such might have been pictured with straight lines instead of stepped lines for color demarcation. In addition this type of filter may also be used either for a noninterlaced intensity scanning sequence or for an interlaced intensity scanning sequence. Instead of the elongated, rectangular color segments 30, 31, and 32, it is obvious that these segments could be shortened up into square, substantial dots of circular or oval shapes or may take other geometrical, such as triangular, shapes provided they are arranged in a regular order.

When the photographic process is employed, as hereinabove described, for producing the transparent color filter from the main target or screen 1, it is obvious that the other than horizontally striped color filter, like Figure 3 and Figure 5 showing must be arranged on the orthicon transmitter tube and the kinescope receiver tube, so that the exact full frame will be covered by the sweeping intensity scanning ray of both the transmitter and receiver. In other words, for each horizontal, sweep of the intensity scanning ray in the transmitter and the synchronized intensity scanning ray in the receiver, the same number of color sections or segments must appear. If the filter is of horizontally arranged color stripes continuous from end to end as in Figure 2, the intensity scanning rays in the transmitter and receiver must start and stop precisely at the beginning and ending of the top and bottom border stripes of the filters respectively, at the same time. Also the area covered by the intensity scanning rays must be in exact registry without geometric distortion to the eye. The transmitter should be maintained at one fixed adjustment and each receiver should be adjusted so as to get exact registry or correspondence with the transmitter.

Instead of the photographic process hereinabove described, wherein the transparent color filter is formed independently of the receiver tube or kinescope, it is to be understood that this invention contemplates also the formation of the color filter for each individual kinescope, so that each receiving station shall have a color filter fitted exactly to the exact peculiar needs or idiosyncrasies of the particular tube and/or receiver with which it is used. This result is accomplished as follows:

The color filter F, see Figure 9 is carried in a frame 33 which is removably held on pins 34 projecting from the front of the receiver kinescope 35 or fixture thereof. It is preferable to provide a spring 36 and a nut 37′ for each pin, so as to hold the frame 33, that is to say, particularly the border portion thereof, tightly against the adjacent front wall of the kinescope 35 when holding the finished filter as in Figure 10.

The color filter F is first positioned as an undeveloped film or plate and a transparent colored sheet 37, see Figure 9, is interposed between the undeveloped filter F and the front face of the kinescope 35. For example after the receiver image has been correctly focused and the intensity scanning ray turned off, a red filter 37 may first be positioned therein. The camera section of the transmitter is now focused on a white screen which is well illuminated and a filter arranged to pass only red is interposed between the camera section of the screen or is otherwise arranged in front of the orthicon tube of the transmitter. In this way the transmitter will only transmit for the red sections or portions of its filter and the corresponding portions of the undeveloped filter F, Figure 9 of the receiver, will then be exposed to the red stripes, during an energized time interval of the receiver intensity scanning ray, that is to say, while the receiver scanning ray is turned on. After an interval of time the red plate or the filter that passes red is removed from the receiver and from the transmitter and the next plate, for example the one that passes green, is positioned in the transmitter and in the receiver and the transmitter is again focused on the white well illuminated screen. After a suitable interval of time for individual simultaneous exposures at many receivers, these colored plates are removed and a blue plate substituted at both the transmitter and the receiver and the process is repeated. The operator at the receiver then merely removes his exposed filter and sends it to a photographic establishment equipped to develop color films. It is returned to him fully developed and he installs it in his receiver by merely placing it upon the pins 34, see Figure 10. In this instance the gap originally occupied by the color plate as indicated at 37 in Figure 9 has been closed. He will find that the color filter is exactly formed to fit the peculiarities or irregularities of his own individual receiver and/or tube.

It is intended that the transmitter station be arranged to transmit instructions to apprise the owners of the several receivers when to change the colored plates during the formation of the color filters.

Obviously a number of different colored filters may be produced to fit any number of different transmitting stations which might have different color filters at the transmitting stations themselves.

In order to insure that every minute element of the subject be televised for each of the three colors employed, the system shown in Figure 19 could be followed. In this system the transmitter camera section is indicated by the reference character 38, the transmitter proper by the reference character 39 and the receiver by the reference character 40. The transmitter orthicon tube 41 is provided with a color filter F and similarly the receiver kinescope tube 42 is provided with a color filter F corresponding, registering, or matching identically the color filter F of the transmitter. The transmitter and the receiver are each provided with a transparent glass or other type of transparent plate having optical index of refraction different from that for air. These plates 43 and 44 are mounted to pivot, in each instance, about a vertical axis indicated by the reference characters 45 and 46 for the transmitter and receiver, respectively. The transmitter and receiver are each respectively provided with a cam 47 and 48 coacting with the glass plates 43 and 44 to rock them about their vertical axes 45 and 46 a minute amount. It is apparent that a ray of light passing through a glass plate extends in a parallel direction after having passed through the glass plate but is deflected or bodily shifted a slight amount if it strikes the glass plate with a small angle of incidence. The result of this is that as the glass plate 43 of the transmitter rocks back and forth in a regular manner, the picture image is shifted with respect to the color filter F in a regular manner also. This shift is minute but is enough to encompass or cause the picture image to commutate or shift an amount of one complete color cycle, such as shown in Figure 3. Obviously the minimum width of filter is one color cycle plus one picture frame width. This shifting of the picture image at the transmitter produces, at most, an almost indistinguishable blurring at the receiver when the filter is of many color cycles, but this blurring, however, is compensated for by an exactly similar shift in the angular position of the glass plate 44 of the receiver. It is to be noted that the shifting of the glass plates 43 and 44 is exactly synchronized and the cams 47 and 48 are driven through speed change mechanisms integral with the synchronous motors 49 and 50, respectively.

It is to be understood that, if desired, a pair of oppositely rocking glass plates indicated at 51 and 52 in Figure 20 may be employed and may be arranged to rock about vertical axes 53 and 54, respectively, which are driven from cams 55 and 56 arranged in a reverse manner and driven through speed change mechanism integral with a motor 57 which may be a synchronous motor. It must be a motor or equivalent actuator running in synchronism with that of each receiver as will be apparent from the following description, and will require corresponding rocking of the plates for the receiver. A peculiarity of the transmitter camera indicated generally at 58, in Figure 20, is that the color filter 59 is stationary as previously described but differing from previous description in that it is located between the two oppositely rocking glass plates 51 and 52. It will be noted in this instance that an image focusing lens 51' may be required interposed between orthicon 60 and nearest rocking plate 51. The orthicon tube is indicated by the reference character 60 and the lens focusing means by the reference character 61. If the dotted lines shown in Figure 20 are followed, it will be seen that the light ray from each section of the picture image is bodily shifted in one direction by the front glass plate 52 and in the opposite direction by the rear glass plate 51 and thus registers with the orthicon tube 60 in exactly the same positions as though it had not been shifted. However, it passes through the color filter in shifting positions as the glass plates 51 and 52 rock back and forth in a regular manner and thus entire color coverage is obtained, since the shift is such as to cover at least one complete cycle of vertical color stripes in the filter 59. On closer scrutiny, it is observable that the color filter 59 might be affixed to either of the plates 51 or 52 on the shifting image side thereof and rock therewith to give exactly the same color commutation or shift between picture image and filter as though it were positioned stationary as shown by reference character 59.

It is apparent that the receiver does not have to have the double shifting glass plates as shown in Figure 20 but may be of the type shown in Figure 6 or Figure 19 providing the kinescope image is made to shift with respect to its stationary filter in synchronism with the image shift at the transmitter, relative the camera filter, to maintain color registration. There will be no perceptible blurring at the receiver due to the shifting of the image as caused by the synchronous shifting of the deflection coil voltage which controls the deflection of the intensity scanning ray of the receiver, if there are many color cycles to minimize the shift or shift cancellation like that provided by the rocking plate of the receiver in Figure 19. The transmitter of Figure 19, in similar fashion, can have the electrical image shift, like that described for the receiver, to cancel the image shift introduced for producing color commutation.

When a direct view receiver is used having rocking plates similar to that shown in Figure 20, it will be necessary to provide a lens in front of the outer rocking plate and in the line of vision of the viewer so that the correct relative positions of a given picture element and a stripe on the color filter will be obtained even though the viewer shifts his position.

While it is preferred as described hereinabove to have each of the filters stationary, it nevertheless is within the realm of this invention to have the filter F, see Figure 21, slidably mounted so that it slides back and forth transversely across the face of the orthicon 62 of the camera 63. This sliding filter is driven by means of a cam 64 which must be driven from a synchronous motor 65 and for perfect results a similar bodily shifted filter must be provided for the receiver. Although the lateral shift or bodily shift of the filter is extremely minute, it may be satisfactory for most operators of receivers to use their receivers like shown in Figure 6 without the shifting color filter providing, as previously described, that the intensity scanning ray is electrically shifted synchronously to maintain receiver image registration with its stationary filter and there will be no perceptible blurring if sufficient color cycles are employed in the filter. However, as stated, perfect results can be obtained only when there is no tendency for blurring at the receiver. Any of the cases herein described having receiver image blurring tendencies may employ a single synchronous rocking glass like the receiver of Figure 19, to cancel this tendency for perfect reception.

It is apparent that if the color stripes are vertical, the picture image is shifted horizontally and if the color stripes are horizontal the picture image is shifted vertically. Accordingly, in Figures 19 and 20, it is apparent that if the color stripes are vertical that the rocking glass plates must rock about vertical axes and similarly, if the color stripes are horizontal, the glass plates must shift about horizontal axes.

The synchronized shifting of the picture image relative to the intensity scanning beam is most clearly illustrated in Figures 11 through 16. In these figures the filter, in each instance, is indicated by the reference character F and the intensity scanning beam coincidence spot is indicated by the reference character S. A strip of picture image, one color stripe in width, and subsectioned slanting with its top end advanced one stripe in the direction of shift, is indicated by the number 66. During a cycle of shift of the picture image, the intensity scanning beam coincidence spot initially starts as indicated at S in Figure 11 and horizontally sweeps across and progresses downwardly over the filter F and the total picture image made up of many strips like 66, one sub-frame for each color of stripe. The shift of the picture image is illustrated using this strip having the area enclosed by the dotted lines 66 and this strip progresses to the right as indicated by the arrows 67 in Figures 11 through 15 while the rocking plate is rocking in a given direction. In this way, every portion of the subject and picture image is exposed for each color, so that there is not even a minute portion of the subject and picture image that is not reproduced with correct color. This is apparent by comparing Figures 11, 12, 13, and 14. It will be seen that during successive sweeps of the intensity scanning beam coincidence spot, horizontally across the filter, that every portion of the subject and picture image is covered for each given color.

For example, for the color red, indicated by the reference character 68, the spot S at different successive times after it starts from the left-hand side of the frame is for each horizontal sweep in its downward progression, registering the picture image strips 66 with the red color stripes 68 in particular. The next color, for example, the blue color stripes 69 then has the spot S located at its upper end at the initial or starting sweep for next time over the picture image. As the shifting of the glass plate progresses farther in the same direction, every portion of the subject and picture image strips 66 is covered by green stripes 70. It will be noted that the strips 66 are subsections of the subject and picture image which are spaced one color cycle apart. The entire picture frame, of course, is made up also of other sets of strips like those numbered 66 and they again are spaced one color cycle apart. There are as many sets of strips as there are filter stripes in one color cycle. During this cycle of shift then, all sets of strips have undergone the same color stripe exposure experience as that of the strips 66 except that simultaneously the experience for each set of strips like 66 was with a different color of the striped filter, for complete color coverage of subject and picture image.

Figure 16:
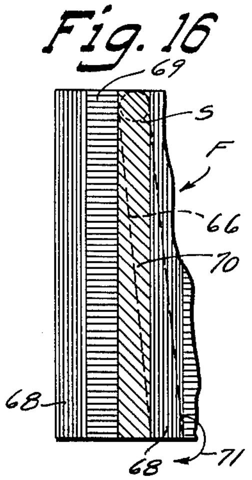
Figure 16 shows the start of the intensity scanning beam coincidence spot on the return half cycle, such view showing a part of the filter.

On the reverse rocking motion of the glass plates, the parallelogram area indicated by the dotted lines 66 are slanted in the opposite direction since new sets of strips of the subject and picture image have been established by the new subsectioning. The initial position of the spot S during the reverse shift of the transparent plates or glass plates is shown in Figure 16. The direction of shift is indicated by the arrows 71 in Figure 16. Double interlaced intensity scanning for the vertical striped filter requires six picture frames or one complete oscillation of the rocking plate for complete color coverage.

For the theoretical diagrammatical illustrations in Figures 11 through 16 it would be necessary for the time displacement curve of the picture image to conform to that shown in Figure 11*a*. However, it is necessary to modify the time displacement curve because of mechanical difficulties due to abrupt changes in motion. It has been found that this difficulty can be overcome by having the design of the cams or other picture image shifting means such as to produce a time displacement curve of the picture image composed of a compound curve formed of a plurality of combined sinusoidal or other curves as shown, for instance in Figure 12*a*, provided a dwell point or arresting point is provided for each color stripe shift, with the end result that the imaginary picture image strips corresponding to 66 in Figure 11 nest with each other to make up the entire picture area.

The invention is not limited with respect to the interlacing of the intensity scanning sequence. For example, triple interlacing may be had if desired to produce a series of sub-frames each of different color to comprise one complete picture frame. This is shown in Figure 17 in which the red, green and blue stripes are shown horizontally and indicated by the reference characters 72, 73, and 74, respectively. The sequence is shown by the arrows in the groups indicated at A, B, and C. It is to be understood from this highly diagrammatic showing in Figure 17, that the first trip of the intensity scanning beam horizontally sweeps across the top color stripe; that the next trip thereafter horizontally sweeps across the fourth color stripe, etc. From the center of the first color stripe to the center of the fourth color stripe $\frac{1}{525}$ of the vertical picture frame height on the filter is indicated and it will be noted that these color stripes in that regular order shown are each red.

Consequently, the first complete sub-frame of the intensity scanning beam only sweeps the red stripes and thus the entire frame is scanned for red. Thereafter, the entire picture frame is intensity scanned for green as indicated by the series of arrows in the group B and similarly in the next order the entire picture frame is intensity scanned for blue as indicated by the series of arrows in the group C. The color stripes 72, 73, and 74 are extremely narrow and three of them cover only the width allowed for one horizontal sweep of the intensity scanning beam which for 525 line scanning per picture frame is one-third of $\frac{1}{525}$ of the picture frame height for each stripe. It will be understood however, that the one picture frame produced by this series of colored sub-frames may also be repeated for complete color coverage by any one of the previously described methods of shifting or commutating the subject and picture image with respect to the filter F. When complete color coverage is thus accomplished it will be noted that a color cycle of picture frames is made up of the same number of picture frames as there are colors in the color cycle in order to expose each strip of subject and picture image to each of the colors.

In the color filter shown in Figure 18, the blue, red and green stripes are indicated, respectively, by the reference characters 75, 76, and 77 and a clear stripe by the reference character 78. Four of these stripes constitute or occupy $\frac{1}{525}$ of the vertical height of one picture frame. In the system with which the color filter shown in Figure 18 is employed, it is intended that all colors be intensity scanned for each frame and that in addition the transparent stripe classified as another color, also be intensity scanned. This added transparent stripe contributes to the brilliancy of the picture. The successive scanning cycles are indicated by the reference characters G, H, I, and J in Figure 18. It is apparent that the actual number of intensity scanning lines per picture frame of the filter in Figure 18 is four times 525 which is 2100 lines per picture frame whereas in Figure 17, the actual number of lines per picture frame of the filter is three times 525, which is 1,575.

It will be seen that novel systems and methods of color television perception, transmission, and reception have been provided by this invention and that many forms of novel devices have been provided, whereby this color television is possible. Also it will be seen that several methods of producing the color filters and several types of color filters have been disclosed by this invention.

It will be seen further that not any of these systems or devices interfere in any manner with the black and white picture transmission for it is merely necessary to remove the color filter from the receiver when so equipped for black and white picture transmission.

Further it is apparent that for receivers equipped only for black and white picture transmission that the color filters used in the transmitters hereinabove described, do not interfere with black and white picture reception although color television pictures are being transmitted. Thus it is possible for those operators who own black and white color television receivers to use such receivers although color television pictures are being transmitted. Also it is possible by relatively simple changes to adapt prior forms of black and white picture television receivers for use with the novel devices herein disclosed whereby color television pictures can be received.

Other ways may be followed for shifting the picture image. For example, one or more corrugated glass plates could be reciprocated to commutate or shift the picture image relative to the color striped filter. For example, one corrugated plate could be located in front of the filter and the other corrugated plate could be located to the rear of the filter. These corrugated plates would be shifted by cam means or other mechanism driven from a synchronous motor.

A still further method of securing commutation or picture image shift with relation to the filter would be to shift the orthicon tube equipped with the filter means of mechanism driven from a synchronous motor. The shift would be so minute that it would be merely necessary to mount the rear end of the orthicon tube in some form of resilient fulcrum mounting and to shift the front end of the tube with its filter.

It is to be understood that any number of color stripes, elements, or sections and any degree or extent of shift of the picture image can be employed. Clearly, as the number of color stripes, elements, or sections decreases, the shift must necessarily increase. Therefore, it is to be understood that the invention, in its broadest aspect, contemplates any desired number of color stripes, elements, or sections and any degree of shift provided the entire picture is subjected to each color.

While horizontal and vertical color stripes have been shown and described in illustrating certain forms of the invention, it is further to be understood curved or other contoured color stripes could be used provided the same type was used at both the transmitter and receiver.

In order to have exact relative color intensity throughout the entire picture, it is necessary to have the image shifting means produce uniform linear shift of the picture image throughout the entire or complete color commutating process. This may be secured by proper design of the cams or by other means such as a multiplicity of rocking plates each supplying a different sinusoidal component.

In the description, reference has been made to image orthicon tubes for the transmitters and kinescope tubes for the receivers, although it is to be distinctly understood that any suitable tubes can be used and, therefore, it is to be further understood that the expressions "camera tube" and "picture tube" shall refer, respectively, to any tube of these two general types.

It is to be understood that the expression "photoelectric tube" is intended to cover either the camera tube of the transmitter or the picture tube of the receiver.

Although this invention has been described in considerable detail, it is to be understood that such description is intended as illustrative rather than limiting, as the invention may be variously embodied and is to be interpreted as claimed.

I claim:

1. In a television apparatus having a photoelectric tube and having a lens system ahead of said tube, a color filter mounted in a stationary manner, a plate of transparent material having an index of refraction different from that of air mounted ahead of said filter, means for giving motion to said plate to thereby cause image shift with reference to said filter, and a second transparent plate having an index of refraction different from that of air mounted rearwardly of said filter, and means for giving motion to said second plate synchronously and in a reverse manner from that of said first mentioned plate to compensate for image shift produced by said first mentioned plate.

2. Apparatus for use in color television comprising a photoelectric tube, a stationary color filter located in front of said tube and having a multitude of color elements of different colors arranged in a predetermined sequence, shifting means located in front of said filter for shifting the picture image, and shifting means located rearwardly of the filter for electrically shifting the picture image, said shifting means being arranged to cancel each other.

3. Apparatus for use in color television comprising a transmitter provided with a camera tube and means for transmitting signals in response to the actuation of said camera tube, a stationary color filter located in front of the camera tube and having a multitude of color elements of different colors arranged in a predetermined sequence, said transmitter including means located in front of said filter for shifting the picture image with respect to the filter and camera tube and having means located rearwardly of the filter for electrically cancelling the shifting of the picture image.

4. Apparatus for use in color television comprising a receiver provided with a picture tube and means for actuating said tube in response to received signals, a stationary color filter located in front of said picture tube and having a multitude of color elements of different colors arranged in a predetermined sequence, means located rearwardly of said filter for electrically initiating the shifting of the picture image in accordance with the received signals, and means located in front of said filter for cancelling the said shift of the picture image.

References Cited in the file of this patent

UNITED STATES PATENTS

| Number | Name | Date |
|---|---|---|
| 2,243,828 | Leverenz | May 27, 1941 |
| 2,296,908 | Crosby | Sept. 29, 1942 |
| 2,431,115 | Goldsmith | Nov. 18, 1947 |
| 2,452,293 | De Forest | Oct. 26, 1948 |
| 2,479,517 | Schensted | Aug. 16, 1949 |
| 2,512,123 | Weimer | June 20, 1950 |

FOREIGN PATENTS

| Number | Country | Date |
|---|---|---|
| 589,345 | Great Britain | Oct. 22, 1945 |